United States Patent [19]

Gohlisch

[11] Patent Number: 5,055,244
[45] Date of Patent: Oct. 8, 1991

[54] PROCESS AND APPARATUS FOR THE PRODUCTION OF THIN WALL TUBES FROM RUBBER - AND/OR PLASTIC MIXTURES

[75] Inventor: Hans-Joachim Gohlisch, Hanover, Fed. Rep. of Germany

[73] Assignee: Paul Troester Maschinenfabrik, Hanover, Fed. Rep. of Germany

[21] Appl. No.: 470,937

[22] Filed: Jan. 26, 1990

[30] Foreign Application Priority Data

Jan. 27, 1989 [DE] Fed. Rep. of Germany ....... 3902405

[51] Int. Cl.$^5$ .............................................. B29C 47/92
[52] U.S. Cl. .................................. 264/40.3; 264/40.4; 264/40.7; 425/140; 425/141; 425/145
[58] Field of Search ..................... 264/40.3, 40.4, 40.7, 264/40.1, 209.1, 40.2; 425/141, 140, 135, 170, 145

[56] References Cited

U.S. PATENT DOCUMENTS

| | | | |
|---|---|---|---|
| 1,544,255 | 6/1925 | Maynard | 264/209.1 |
| 3,787,552 | 1/1974 | Spencer et al. | 264/40.3 |
| 4,095,156 | 6/1978 | Borisov et al. | 425/135 |
| 4,156,913 | 5/1979 | Apicella, Jr. | 425/141 |
| 4,355,966 | 10/1982 | Sweeney et al. | 264/40.2 |
| 4,470,937 | 9/1984 | Sugimoto et al. | 425/140 |
| 4,551,289 | 11/1985 | Schwab et al. | 264/40.1 |

FOREIGN PATENT DOCUMENTS

| | | | |
|---|---|---|---|
| 2157051 | 6/1973 | France | 264/40.2 |
| 57-113036 | 7/1982 | Japan | 264/40.2 |
| 61-40131 | 2/1986 | Japan | 264/178 R |

Primary Examiner—Jeffery Thurlow
Attorney, Agent, or Firm—Robert E. Burns; Emmanuel J. Lobato

[57] ABSTRACT

Apparatus for producing, from rubber and/or plastic mixtures, thin wall tubes for bicycle and motorcycle tires includes an extruder followed by a belt conveyor for transporting the extruded tube blank from the extruder, a scale for weighing the tube blank, another belt conveyor, rolls for forming the blank to a predetermined cross sectional shape and a light source on one side of the tube blank and a light receiver on the opposite side of the tube blank for measuring a transverse dimension of the shaped tube blank and thereby its circumferences. A blower supplies to the interior of the tube blank a mixture of air and powder which is removed by an exhaust blower which is regulated to control the air pressure in the tube blank. The rate of withdrawal of the tube blank from the extruder by the conveyor and the air pressure inside the tube blank are controlled by outputs of the scale and the transverse dimension measuring light receiver.

10 Claims, 1 Drawing Sheet

PROCESS AND APPARATUS FOR THE PRODUCTION OF THIN WALL TUBES FROM RUBBER - AND/OR PLASTIC MIXTURES

The invention relates to a process and an apparatus for the production of thin wall tubes from rubber—and/or plastic mixtures through extrusion and drawing in which powder-loaded air is continually introduced into the interior of the tube and, after deposit of the greater part of the powder on the inner wall of the tube, is withdrawn.

BACKGROUND OF THE INVENTION

In the production of tubes from mixtures of rubber and/or similar plastic material for use as bicycle or motorcycle tubes a long tube blank is continuously extruded. This extrusion is carried out with extrusion heads which produce either one, or two parallel tube blanks. For the production of bicycle or motorcycle tubes the long tube blank is cut into lengths which are bent in circular form and the ends bonded together. Modern production and vulcanizing methods provide for uniting the cut ends on impact. By this uniting of the ends of the cut blank there is produced a tube which, as compared with earlier overlapped joints, uses less material and produces a homogeneous tube which is quiet-running in use.

A prerequesite for this production is that the production precision of the cut extruded tube blank is extremely high so that the butt joint is tight but moreover is possible. For this joining of the ends, the diameter and wall thickness of both ends of the cut tube blank must be very exact. Heretofore this high precision has been attained by hand control of the production mechanism for each individual cut tube blank on the ground of great experience of the service person. However, it was not achieved that in the production of thousands of tube blanks the wall thickness and the cross section dimensions for all of the blanks remained the same. For example, after the production of some hundreds of cut tube blanks substantial dimension differences could be detected between the first, the hundreth and the five hundreth tube blank. That is meaningless for the use of the tubes in power vehicle tires but not for a commercial production.

Tubes for these purposes are on many grounds, principally material cost and short vulcanizing time, made very thin walled. This makes keeping the wall thickness and the cross section dimensions over long extrusion times still more difficult. By reason of this it is indespensible, in particular for thin wall tube blanks, to clean the mixture before leaving the extruder i.e. by pressing it through sieves or strainers so that no production rejects arise through almost unavoidable mixture impurities. A single grain of sand in a thin wall tube can have devastating results. On these grounds, the earlier usual mixture preheating on roller mills has, in recent times, been abandoned in order to avoid the mixture contamination from intermittent operation of the extruder and thereby increase the uniformity of the product.

The vulcanizable or polymerizable mixture of rubber and/or plastic coming from the extruder for processing is very weak, highly viscous and also temperature sensative. In order to prevent the extruded tube blank, which immediately after extrusion becomes oval and has a tendency to lie flat, from sticking together, the tube blank is supported internally with air and thereby also powdered. For this purpose an air-powder mixture is continually introduced through the mandrel of the extrusion head. Excess air must be removed from the interior of the tube blank through a parallel path in order to prevent a blowout of the extrusion. There is thus a problem of maintaining the supporting air in the tube constant as the over pressure with respect to ambient air can be only a few hecto-pascal and must be held constant with great accuracy. For holding the pressure constant, an accurate pressure valve and in particular a sensitive water seal is used.

Holding the supporting air pressure constant is in itself not sufficient as the production parameters change during the production as the sieve is gradually clogged with the collected dirt particles and hence less material is passed through the sieve and the material pressure in front of the sieve increases, with a resulting change in the temperature of the material which alters the viscosity of the mass inter alia and this leads, with constant inner pressure of the tube, to an alteration in the tube cross section.

SUMMARY OF THE INVENTION

The invention eliminates the disadvantages of the state of the art. It is the object of the invention to hold the dimensions of the extruded tube blank constant over long periods of operation and thereby on the one hand to save material and on the other hand to improve the quality of the tube produced.

The invention resides therein that the extruded, drawn and air-filled tube is given a predetermined form over a part of its circumference and, in a part not in contact with the forming tools, the height, cross section or width of the tube is measured and this measurement is used as the basis of control of the supporting air pressure and/or the rate at which the tube is drawn from the extrusion head.

This is accomplished by apparatus which is characterized in that it comprises a measuring device for measuring the width and/or height of the tube, that the tube-form air filled extrudant downstream of the drawing device is led through forming tools in the region of the measuring device and that the measuring device is connected with a control device for controlling the amount of air injected into or withdrawn from the tube and/or the rate of withdrawal of the drawing device.

The dimensions of the tube blank which, directly after its extrusion and drawing, is still of very unstable form and moreover is supported with air, can be measured only poorly with normal measuring instruments. If, on the contrary, this tube blank is given a definite geometric form, the circumference of the tube blank can be measured with a height and/or width measuring device which can, for example, work with a photodiode array. The circumference of the tube blank can be held constant when the result of the height and/or width measurement is used as the basis for control of the pressure of the air introduced into the extruded tube and/or a control of the rate of withdrawal of the tube from the extrusion head. If the circumference of the extruded tube blank is too small it can be increased by increasing the pressure of the air support (and conversely) a similar result can also be obtained by slowing down the drawing mechanism. With this control it is possible to hold the circumference dimensions of the tube precisely constant over an unlimited period of operation, even with changes in the rate of flow of the material through gradual clogging of the filter.

In order also to hold the wall thickness of the extruded tube blank fully constant over a long period of operation, it is advantageous to measure the weight of a given length of the extruded blank, compare it with a desired value and use the deviation as a basis for controlling the rate of withdrawal of the blank from the extruder head and/or rate of rotation of the extruder.

For this purpose there is arranged between the drawing mechanism and the height and/or width measuring device a length-weight scale of which the output signal is fed to a device for controlling the rate of withdrawal of the tube from the extruder head and/or the rate of rotation of the extruder.

With these controls, all dimensions of the tube blank can be kept constant over a long period of operation. It is thereby possible to effect an important saving of material and to keep the production very economical.

The forming of the tube blank for carrying out the height and/or width measurement advantageously comprises two rollers, preferably two pairs of rollers between which the blank is past.

On account of the scarcely avoidable mixture contamination, it is advantageous to combine the tube formation with the nozzle strainer. Owing to the decrease in the permeability of the sieve of the strainer through contamination, the discharge of the extruder with the same rate of rotation of the extruder screw decreases which, likewise, leads unavoidably with the same drawing rate to a length weight and mass alteration of the extrudant. It is therefore advantageous to determine the weight per unit length of the tube with a suitable scale and, upon variation from a desired value, make corresponding correction of the rate of drawing or the rate of rotation of the extruder.

The essence of the present invention will be explained more fully below with reference to exemplar embodiments schematically shown in the drawings in which FIG. 1 is a side elevation of the apparatus for producing thin wall tubes, and FIG. 2 is a cross section of the tube between the two pairs of rollers.

DESCRIPTION OF PREFERRED EMBODIMENT

Figure 1:
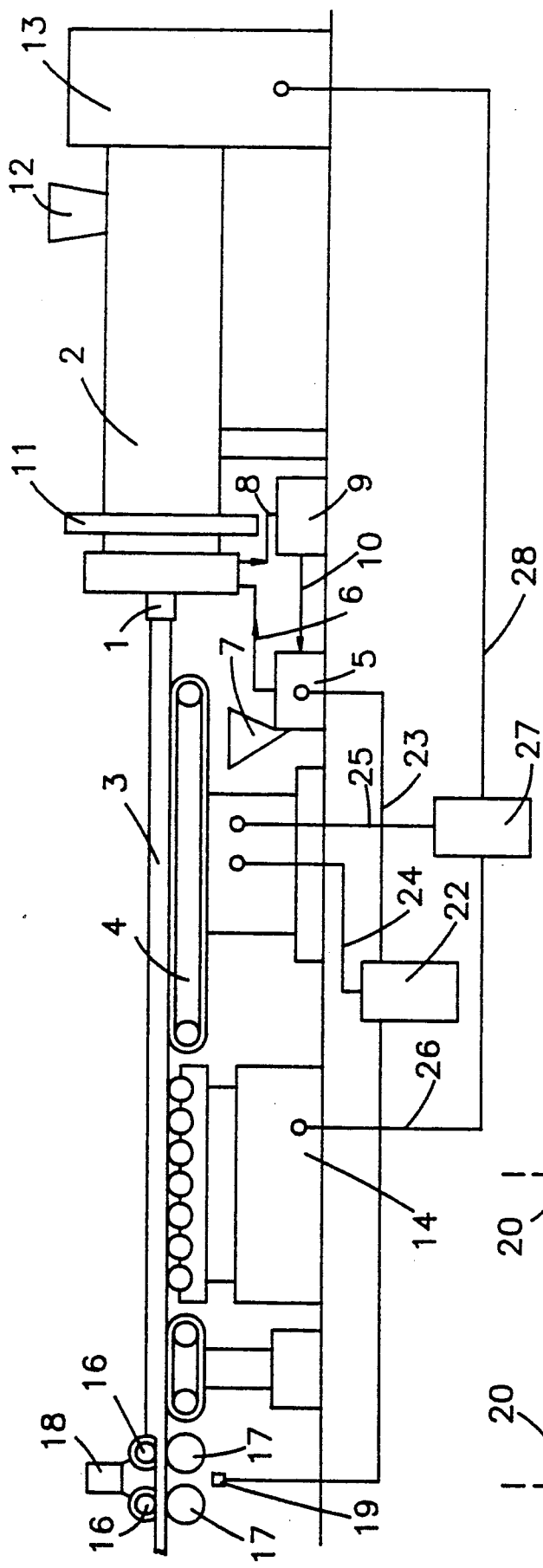

From the extrusion head 1 of the extruder 2 emerges a tube blank 3 which is drawn out by drawing apparatus 4, shown as comprising a conveyor belt, and further transported. The tube blank 3 is filled with air supplied by compressed air producing apparatus 5 through the compressed air conduit 6 and a not visible mandrel in the extrusion head 1. In this compressed air producing apparatus 5 the air transported through the conduit 6 is mixed with powder supplied through the filling hopper 7. The over pressure of the compressed air produced in the compressed air producing apparatus 5 is relatively limited, lying in the order of a few hekto-Pascal. The excess air is drawn out of the tube blank through the conduit 8 and led to an apparatus 9 which contains a controllable under pressure producer. This air removal apparatus 9 can be connected with the compressed air producing apparatus 5 through a conduit 10.

Directly behind the extrusion head 1, there is preferably provided apparatus (not shown) for powdering the outer surface of the tube blank 3.

In the extrusion head 1 there are sieves which are changeable by a sieve changing apparatus 11. The mixture to be extruded is fed to the extruder 2 through the hopper 12 in a cold state. The drive of the extruder screw is accommodated in the housing 13.

Figure 2:
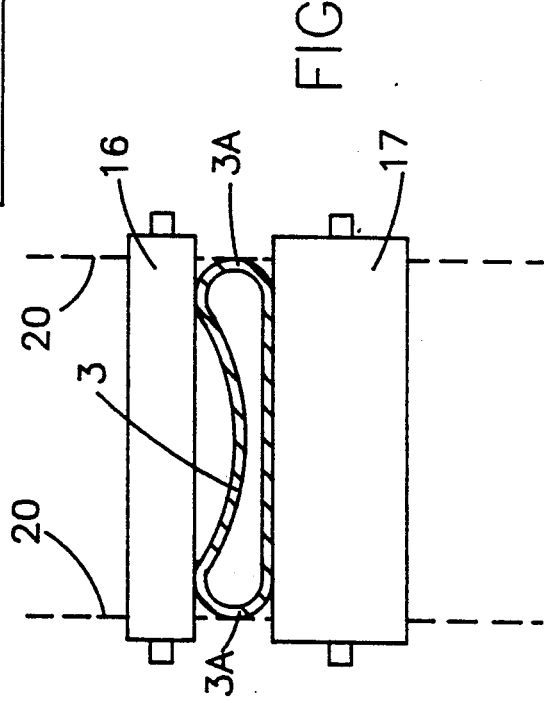

Behind the drawing apparatus 4 is arranged a length-weight scale 14 and behind this is a further transport device 15 in the form of a conveyor belt. Subsequently, there are arranged two pairs of rollers 16, 17 of which the lower rollers 17 serve as support rollers while the upper rollers 16 form the tube blank 3 in a particular manner. As seen in FIG. 2, the tube blank is not formed to a flattened shape on which opposite sides of the tube blank are pressed together. Despite the powder which is blown into the tube blank, opposite sides of the tube blank, if pressed together, could adhere to one another. Between the two roller pairs 16, 17 there is arranged a measuring device, comprising a light transmitter 18 and a light receiver 19, for measuring a cross sectional dimension, in particular a transverse dimension of the tube blank. A part of this light receiver 19 will be masked by the tube blank 3. The edge rays 20 (FIG. 2) transmitted to the light receiver thus mark the positions of the edges of the slightly pressed-together tube blank 3. The tube blank is brought by the roller pairs 16, 17 to a definite height, while both sides can freely expand. This expansion can be measured through the width measurement by means of the edge rays 20. Thereby the circumferential length can be determined. The signal from the light receiver 19 representing the width of the tube blank 3 is transmitted through the line 21 to control apparatus 22. An output of this control apparatus 22 is connected by line 23 with the air pressure control of the air pressure producing device 5. If the width of the tube blank increases the air pressure is reduced. Conversely, if the width of the tube blank as sensed by the width measuring device decreases, the air pressure in the tube blank is increased. The circumferential dimension of the tube blank is thereby kept constant. Instead of being connected with the air pressure producing device 5, the control apparatus 2 can be connected with the air exhaust device 9. In the air exhaust device 9 either a valve or a suction device can be controlled. Often it is preferable to control the air exhaust as a control of the air pressure producing device effects the amount of powder supplied to the interior of the tube blank.

Another output of the control apparatus 22 is connected through a line 24 with the drive 25 of the drawing device 4. Through control of the drawing device the circumferential dimension of the tube blank can be decreased by increasing the rate of drawing and conversely can be increased by decreasing the rate of drawing.

The weight signal output of the length-weight measuring device 14 is transmitted by a line 26 to a further control apparatus 27 the output of which is connected by a line 25 with the drive of the drawing device 4 and/or by a line 28 with the drive 13 of the screw of the extruder 2. If an increase in weight is detected by the weighing device, the rate of drawing is increased and/or the rate of rotation of the extruder screw is decreased. Conversely if a decrease in weight per unit length is detected by the weighing device, the rate of drawing is decreased and/or the speed of rotation of the extruder screw is increased, for example, to offset the clogging of the filter sieve. Thus the weight per unit length of the tube blank is kept constant.

I claim:

1. Apparatus for producing thin wall tubes of rubber and/or plastic mixture comprising,
    an extruder having a rotatable screw, means for driving said screw and an extruder head for extruding a thin wall tube blank, means for drawing the tube blank from the extruder head, means for introducing powder-loaded air under pressure into the extruded tube blank and for withdrawing air from said tube blank after at least a portion of the powder has been deposited on the inner wall surface of the tube blank, means for controlling air pressure in said tube blank, means downstream of said drawing means for weighing a predetermined length of said tube blank and producing a weight-per-unit-length signal, means located downstream of said weighing means for forming the tube blank into a predetermined cross sectional shape, other than a flattened shape in which opposite sides of the tube blank are pressed together, means adjacent said shape forming means for measuring a transverse dimension of said formed tube blank and for producing a signal indicative of the measured transverse dimension of said tube blank, and control means connected with said measuring means to receive said transverse dimension indicative signal, connected with said weighing means to receive said weight-per-unit-length signal and connected with at least one of said drawing means, said air pressure controlling means and said extruder screw driving means to control at least one of the rate of drawing of said tube blank, the air pressure in said tube blank and the rate of driving said extruder screw to maintain the cross sectional dimensions of said tube blank and the weight-per-unit-length of said tube blank constant over a long operating period.

2. Apparatus according to claim 1, in which said means for forming said tube blank into a predetermined shape comprises two pairs of rollers with a space between said pairs, said measuring means being disposed in the space between said roller pairs.

3. Apparatus for producing thin wall tubes of rubber —and/or plastic mixtures comprising, an extruder having a rotatable screw, means for driving said screw and an extruder head for extruding a thin wall tube blank, means for drawing the tube blank from the extruder head, means for introducing powder-loaded air under pressure into the extruded tube blank and for withdrawing air from the tube blank after at least a portion of the powder has been deposited on the inner wall surface of the tube blank, means for controlling air pressure in said tube blank, means downstream of said drawing means for measuring the weight of a given length of said extruded tube blank and producing a weight signal, control means connected with said weight measuring means to receive said weight signal and connected with at least one of said drawing means and said extruder screw driving means to control at least one of the rate of drawing of said tube blank from said extruder head and the rate of rotation of said screw to maintain the weight over unit length of said extruded tube blank constant over a long operating period.

4. A process for the production of thin wall tube from a rubber and/or plastic mixture through extrusion and drawing which comprises, extruding a thin wall tube blank from the extruder head of an extruder having a rotatable screw and means for driving said screw, drawing said extruded thin wall tube blank from said extruder head, introducing powder loaded air under pressure into said extruded tube blank and withdrawing said air after at least a portion of the powder has been deposited on the inner wall of said tube blank, weighing a predetermined length of said tube blank, subsequent to the drawing of said tube blank to obtain a weight-per-unit-length signal, imparting a predetermined cross sectional shape other than a flattened shape to said tube blank subsequent to said weighing of a predetermined length of said tube blank, measuring at least one of the width and height of said tube blank to which said predetermined cross sectional shape has been imparted to obtain a width and/or height signal and using said weight-per-unit-length signal and said width and/or height signal for controlling at least one of the air pressure in said tube blank, the rate of drawing said tube blank from said extruder head and the rate of driving said extruder screw to maintain the cross section of said tube blank and the weight-per-unit-length of the tube blank constant over a long period of operation.

5. A process according to claim 4, in which said predetermined cross sectional shape is imparted to said tube blank by two pairs of rollers with a space between said pairs and in which at least one of the width and height of said tube blank is measured in said space between said pairs of rollers where the tube blank is out of contact with said rollers.

6. Apparatus for producing thin wall tubes of rubber and/or plastic mixtures comprising, an extruder having a rotatable screw, means for rotating said screw at a variable rate and an extruder head for extruding a thin wall tube blank, conveyor means for transporting said tube blank from said extruder head at a variable rate, means downstream of said conveyor means for measuring the weight per unit length of said blank and producing an output signal proportional to said measured weight per unit length, control means connected with said weight measuring means for receiving said output signal and connected with at least one of said screw rotating means and said conveyor means for controlling at least one of the rate of rotation of said screw and the rate of transporting said blank by said conveyor means to maintain constant the weight of said blank per unit length.

7. Apparatus according to claim 6, further comprising, means for introduce powder-containing air into said tube blank, means for varying the pressure of said air in said tube blank, means downstream of said weight measuring means for forming said tube blank into a predetermined cross sectional shape other than a flattened shape, means adjacent said shape forming means for measuring a cross sectional dimension of said formed tube blank and producing an output signal proportional to said measured dimension, and control means connected with said cross sectional dimension measuring means to receive said output signal, and connected with at least one of said air pressure varying means and said conveyor means to vary at least one of said air pressure in said tube blank and the rate of transport of said tube blank by said conveyor means to maintain constant the cross sectioned shape of said tube blank.

8. Apparatus according to claim 7, in which said tube blank shape forming means comprises two pairs of rollers, said pairs of rollers being spaced one down stream of the other, and in which said cross sectional dimension measuring means is disposed between said two pairs of rollers.

9. Apparatus according to claim 8, in which said cross sectional dimension measuring means comprises a light source on one side of said tube blank and means on the opposite side of said tube blank for receiving light from said light source and producing said output signal proportional to said measured dimension.

10. Apparatus according to claim 7, further comprising conveyor means for transporting said tube blank between said weight measuring means and said tube blank shape forming means.

* * * * *